(12) United States Patent
Dhawan et al.

(10) Patent No.: US 9,497,207 B2
(45) Date of Patent: Nov. 15, 2016

(54) SECURING OF SOFTWARE DEFINED NETWORK CONTROLLERS

(71) Applicant: International Business Machines Corporation, Armonk, NY (US)

(72) Inventors: Mohan Dhawan, New Delhi (IN); Kshiteej S. Mahajan, Aurangabad (IN); Vijay Mann, Gurgaon (IN); Rishabh Poddar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/460,976

(22) Filed: Aug. 15, 2014

(65) Prior Publication Data

US 2016/0050223 A1 Feb. 18, 2016

(51) Int. Cl.
 *H04L 29/06* (2006.01)

(52) U.S. Cl.
 CPC ....... *H04L 63/1425* (2013.01); *H04L 63/1441* (2013.01)

(58) Field of Classification Search
 CPC H04L 63/1425; H04L 63/20; H04L 63/1441
 See application file for complete search history.

(56) References Cited

U.S. PATENT DOCUMENTS

| | | | | |
|---|---|---|---|---|
| 8,671,176 | B1 * | 3/2014 | Kharitonov | H04L 45/02 709/219 |
| 9,038,151 | B1 * | 5/2015 | Chua | H04L 45/02 709/223 |
| 9,166,988 | B1 * | 10/2015 | Shin | H04L 63/14 |
| 9,178,807 | B1 * | 11/2015 | Chua | H04L 45/02 |
| 2006/0010389 | A1 * | 1/2006 | Rooney | H04L 63/1425 715/736 |
| 2008/0301765 | A1 * | 12/2008 | Nicol | H04L 41/142 726/1 |
| 2010/0071062 | A1 * | 3/2010 | Choyi | H04L 63/1441 726/23 |
| 2010/0251329 | A1 * | 9/2010 | Wei | H04L 63/1408 726/1 |
| 2013/0311675 | A1 * | 11/2013 | Kancherla | H04L 43/026 709/244 |
| 2014/0075519 | A1 | 3/2014 | Porras et al. | |
| 2014/0115706 | A1 * | 4/2014 | Silva | H04L 63/1425 726/23 |
| 2014/0130160 | A1 * | 5/2014 | Golovanov | H04L 63/1441 726/23 |
| 2014/0192645 | A1 * | 7/2014 | Zhang | H04L 47/12 370/235 |
| 2014/0380415 | A1 * | 12/2014 | Wang | H04L 43/026 726/1 |
| 2015/0172300 | A1 * | 6/2015 | Cochenour | H04L 63/1425 726/23 |
| 2015/0236895 | A1 * | 8/2015 | Kay | H04L 43/045 709/224 |
| 2015/0341379 | A1 * | 11/2015 | Lefebvre | H04L 43/0894 726/22 |

OTHER PUBLICATIONS

Mai, Haohui et al., "Debugging the Data Plane with Anteater", SIGCOMM'11, Aug. 15-19, 2011, Toronto, Ontario, Canada, pp. 290-301, ACM Digital Library.

Shin, Seungwon et al., "AVANT-GUARD: Scalable and Vigilant Switch Flow Management in Software-Defined Networks", CCS'13, Nov. 4-8, 2013, Berlin, Germany, 12 pages, ACM Digital Library.

(Continued)

*Primary Examiner* — Joseph P Hirl
*Assistant Examiner* — J. Brant Murphy
(74) *Attorney, Agent, or Firm* — Ference & Associates LLC (57) ABSTRACT

Methods and arrangements for securing a software defined network. One or more control messages are intercepted. Information is extracted from the one or more control messages to create a global network state model, and there is determined, from the extracted information, presence of at least one prospective modification to the global network state model. Thereupon, a determination is made as to whether the at least one prospective modification presents a threat to security of the software defined network. Other variants and embodiments are broadly contemplated herein.

20 Claims, 8 Drawing Sheets

(56) References Cited

OTHER PUBLICATIONS

Curtis, Andrew R. et al., "DevoFlow: Scaling Flow Management for High-Performance Networks", SIGCOMM'11, Aug. 15-19, 2011, Toronto, Ontario, Canada, 12 pages, ACM Digital Library.
Yu, Minlan et al., "Scalable Flow-Based Networking with DIFANE", SIGCOMM'10, Aug. 30-Sep. 3, 2010, New Delhi, India, pp. 351-362, ACM Digital Library.
Porras, Phillip et al., "A Security Enforcement Kernel for OpenFlow Networks", HotSDN'12, Aug. 13, 2012, Helsinki, Finland, pp. 121-126, ACM Digital Library.
Kazemian, Peyman et al., "Real Time Network Policy Checking using Header Space Analysis", 10th USENIX Symposium on Networked Systems Design and Implementation (NSDI'13), Apr. 2-5, 2013, Lombard, IL, pp. 99-111, USENIX Association, Berkeley, USA.
Kazemian, Peyman et al., "Header Space Analysis: Static Checking for Networks", 9th USENIX Symposium on Networked Systems Design and Implementation (NSDI'12), Apr. 25-27, 2012, San Jose, CA, 15 pages, USENIX Association, Berkeley, California, USA.
Khurshid, Ahmed et al., "VeriFlow: Verifying Network-Wide Invariants in Real Time", 10th USENIX Symposium on Networked Systems Design and Implementation (NSDI'13), Apr. 2-5, 2013, Lombard, IL, pp. 15-27, USENIX Association, Berkeley, California, USA.
Koponen, Teemu et al., "Onix: A Distributed Control Platform for Large-scale Production Networks", 9th USENIX Symposium on Operating Systems Design and Implementation (OSDI'10), Oct. 4-6, 2010, Vancouver, BC, Canada, pp. 351-364, USENIX Association, Berkeley, California, USA.
Cai, Zheng, "Maestro: Achieving Scalability and Coordination in Centralized Network Control Plane", A Thesis Submitted in Partial Fulfillment of the Requirements for the Degree Doctor of Philosophy, Rice University, Aug. 2011, Houston, TX, USA, 124 pages, Available at : https://code.google.com/p/maestro-platform/downloads/detail?name=thesis.pdf, Accessed on Jul. 28, 2014.
Tootoonchian, Amin et al., "HyperFlow: A Distributed Control Plane for OpenFlow", INM'10, Apr. 28-30, 2010, San Jose, CA, USA, 8 pages, USENIX Association, Berkeley, California, USA.
Sherwood, Rob et al., "Can the Production Network Be the Testbed?", 9th USENIX Symposium on Operating Systems Design and Implementation (OSDI'10), Oct. 4-6, 2010, Vancouver, BC, Canada, pp. 1-14, available at: http://static.usenix.org/legacy/events/osdi10/tech/full_papers/Sherwood.pdf, Accessed on Jul. 25, 2014, USENIX Association, Berkeley, California, USA.
Shin, Seugwon et al., "FRESCO: Modular Composable Security Services for Software-Defined Networks", 20th Annual Network and Distributed System Security Symposium (NDSS'13), Feb. 24-27, 2013, San Diego, CA, USA, 22 pages, The Internet Society 2013, Reston, Virginia, USA.
Radware, "Radware Introduces DefenseFlow Using Cisco eXtensible Network Controller to Offer SDN DoS and DDoS Protection as a Native Network Service", Jun. 25, 2013, Orlando, FL, USA, 1 page, available at: http://portals.radware.com/newsevents/pressrelease.aspx?id=1631886, Accessed on Jul. 25, 2014, Radware Press Release, Mahwah, New Jersey, USA.
Radware, "Radware Releases Defense4All, Industry-First Open SDN Security Application for OpenDaylight Project", Open Daylight Summit, Feb. 4, 2014, Santa Clara, CA and Mahwah, NJ, USA, 4 pages, available at: http://www.radware.com/NewsEvents/PressReleases/Radware-Releases-Defense4All-Industry-First-Open-SDN-Security-Application-for-OpenDaylight-Project/, Accessed on Jul. 25, 2014, Radware Press Release, Mahwah, New Jersey, USA.

* cited by examiner

| # | Trigger | Policy |
|---|---|---|
| P1 | PACKET_IN | IP-MAC binding is permissible. |
| P2 | | Network topology change is permissible. |
| P3 | FLOW_MOD | Current flow path must not have a loop. |
| P4 | | Current flow path must not have a black hole. |
| P5 | | Current path ensures reachability between SRC & DST. |
| P6 | | Current flow path contains specific waypoint. |
| P7 | Periodic | Throughput for a flow/switch port is below a threshold. |
| P8 | | Switch must not drop or siphon off packets in the flow. |

| Feature | Description |
|---|---|
| Subject | FLOWID ∈ {(SRCID, DSTID) \| *} |
| Object | FLOW PROPERTIES ∈ {RULES \| COUNTERS \| WAYPOINTID(s) \| BYTES \| PACKETS \| * \| etc.} |
| Operation | IN \| MATCH \| BOOLEAN \| COMPARISON \| etc. |
| Trigger | PACKET_IN \| FLOW_MOD \| PERIODIC |

```
<Policy PolicyId="1">
  <Rule RuleId="Waypoints" Action="Allow">
    <Subjects><Subject value="*"/></Subjects>
    <Objects>
      <Object><Waypoint value="2"/></Object>
      <Object><Waypoint value="3"/></Object>
    </Objects>
    <Operation value="IN"/>
    <Trigger value="Periodic"/>
  </Rule>
</Policy>
```

SECURING OF SOFTWARE DEFINED NETWORK CONTROLLERS

BACKGROUND

Software defined networks (SDNs) have gained great favor in recent years, but continue to present security issues. Generally, they can be vulnerable to attacks from compromised controllers, switches and end hosts. For instance, while it is often assumed that a SDN controller does not exist in the data plane but in a secure, hardened out-of-band network, they often are not so located. Compromised, misconfigured controller nodes can propagate and trigger cascading network failures, while malicious nodes can send malformed or forged packets to corrupt routing tables or create network outages.

Generally, a SDN controller is decentralized. A clustered SDN controller can be fault-tolerant but still largely insecure. At the same time, security features for SDN controllers often present as merely optional, and even these may not be fully suitable. For instance, TLS (transport layer security) communication can be provided between switch and controller but even here, several types of attack are still possible. Also, attacks afflicting traditional networks can affect SDNs as well, and SDNs may be particularly vulnerable here; traditional defenses may not always work in SDNs, while SDN switches generally serve as mere forwarding entities without intelligence.

BRIEF SUMMARY

In summary, one aspect of the invention provides a method of detecting security attacks and securing a software defined network, said method comprising: utilizing at least one processor to execute computer code configured to perform the steps of: intercepting one or more control messages; extracting information from the one or more control messages to create a global network state model; determining, from the extracted information, presence of at least one prospective modification to the global network state model; and thereupon determining whether the at least one prospective modification presents a threat to security of the software defined network.

Another aspect of the invention provides an apparatus for detecting security attacks and securing a software defined network, said apparatus comprising: at least one processor; and a computer readable storage medium having computer readable program code embodied therewith and executable by the at least one processor, the computer readable program code comprising: computer readable program code configured to intercept one or more control messages; computer readable program code configured to extract information from the one or more control messages to create a global network state model; computer readable program code configured to determine, from the extracted information, presence of at least one prospective modification to the global network state model; and computer readable program code configured to thereupon determine whether the at least one prospective modification presents a threat to security of the software defined network.

An additional aspect of the invention provides a computer program product for detecting security attacks and securing a software defined network, said computer program product comprising: a computer readable storage medium having computer readable program code embodied therewith, the computer readable program code comprising: computer readable program code configured to intercept one or more control messages; computer readable program code configured to extract information from the one or more control messages to create a global network state model; computer readable program code configured to determine, from the extracted information, presence of at least one prospective modification to the global network state model; and computer readable program code configured to thereupon determine whether the at least one prospective modification presents a threat to security of the software defined network.

A further aspect of the invention provides a method comprising: intercepting one or more control messages flowing to one or more network controllers, the one or more control messages comprising one or more control messages determined to be relevant to network security; extracting information from the one or more control messages to create a global network state model; defining a permissible global network state; and determining whether at least one prospective modification to the global network state model presents a threat to security, via: recording a deviation from the permissible global network state; and thereupon generating an alert.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 8. In accordance with an exemplary embodiment, most if not all of the process steps, components and outputs discussed with respect to FIGS. 1-6 can be performed or utilized by way of a processing unit or units and system memory such as those indicated, respectively, at 16' and 28' in FIG. 8, whether on a server computer, a client computer, a node computer in a distributed network, or any combination thereof.

Broadly contemplated herein, in accordance with at least one embodiment of the invention, are systems and methods for securing a software defined network, wherein malicious network events and entities are identified through network invariant learning and replicated execution, via: intercepting and/or replicating a small set of relevant control messages that flow between network elements or system administrators and one or more network controllers; extracting header information from these control messages to incrementally create a global network state model; validating modifications to a global network state to a previously known permissible global network state; generating an alert for any deviations recorded during the validation phase; and recording administrator feedback on alerts to augment a permissible global network state. In an embodiment, the set of control messages that are intercepted are ones that induce changes in the network, e.g., FLOW_MODS, PACKET_INS, FEATURES_REPLY and STATS_REPLY (for an "OpenFlow" protocol). The header information that is extracted from the control messages can include source and destination IP and MAC addresses, information on switches and/or output ports, and flow and port level statistics (e.g., bytes and packets transferred or received). Administrator-defined policies can be specified through a declarative policy language and validated by a policy validator that uses the policies to augment the permissible global network state. Coverage can be provided against a class of existing and novel attacks that involve observable changes to network properties such that these changes can be directly inferred from the intercepted control messages. A minimal Trusted Computing Base can be provided, and leveraged in a manner such that it does not even trust the network controller. A system, as broadly contemplated herein, may reside as a module inside a trusted network controller, or as a proxy which is in-band with respect to the trusted network controller, or as a proxy which is out-of-band with respect to the untrusted network controller. These and other features relating to at least one embodiment of the invention will be better appreciated from the discussion which follows.

Figure 1:
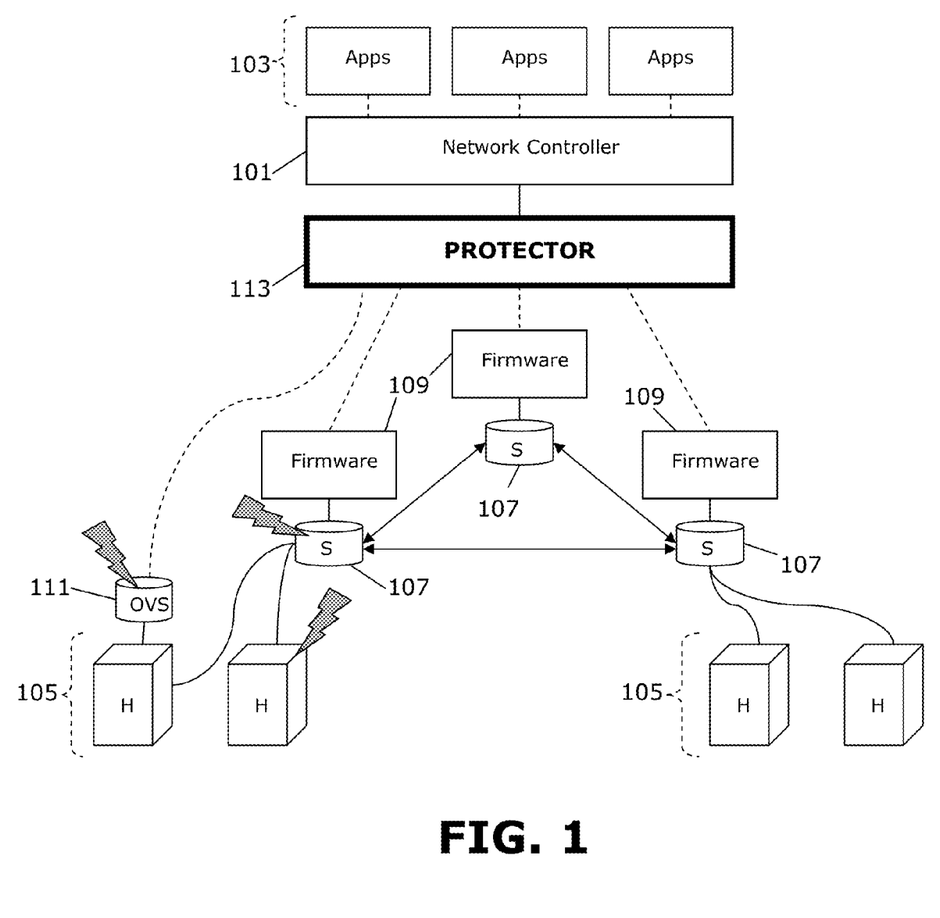
FIG. 1 schematically illustrates an arrangement for securing SDNs with a trusted controller.

FIG. 1 schematically illustrates an arrangement for securing SDNs with a trusted network controller, in accordance with at least one embodiment of the invention. Such an arrangement is secure against active and passive security attacks on SDNs.

As shown, in accordance with at least one embodiment of the invention, the network controller 101 hosts a plurality of applications (or "apps") 103. End hosts (H) 105 themselves are in communication with switches (S) 107, each connected with firmware 109. As shown illustratively, one host 105 is associated with an Open vSwitch (OVS) 111. Potential areas of attack are illustratively depicted by shaded lightning bolts. A protector 113 (or an element including code configured to protect the system) is interposed between the network controller and firmware and OVS, and functions in a manner now to be described.

In accordance with at least one embodiment of the invention, as depicted in FIG. 1, among the assumptions here are that enterprise SDNs are a closed system, that is, there is no malicious interaction with outside networks, wherein most hosts and switches are untrusted while the controller and its applications are trusted. Here, the network's activity (including controller 101, switches 107 and hosts 105) is attested using anomaly detection. All controller communication is mediated by a shim (embodying the protector 113), wherein network behavior is learned and network constraints are automatically generated. Administrative policies and invariants are implemented over network characteristics to guard against undesirable network flows.

Figure 2:
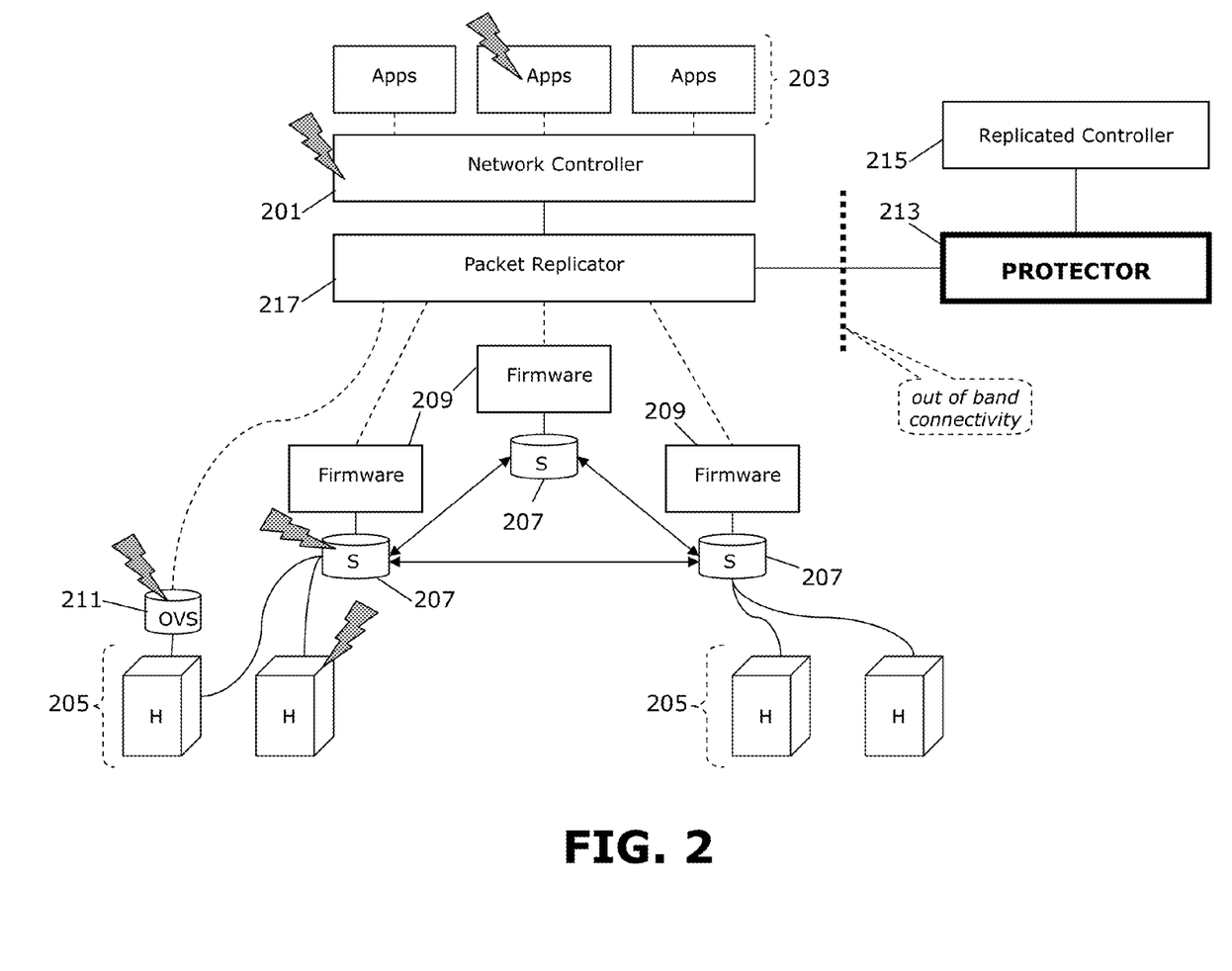
FIG. 2 schematically illustrates an arrangement for securing SDNs with an untrusted controller.

FIG. 2 schematically illustrates an arrangement for securing SDNs with an untrusted controller 201, in accordance with at least one embodiment of the invention. The system here is similar to that in FIG. 1, though with some differences now to be appreciated; similar components with respect to FIG. 1 bear reference numerals advanced by 100. Here, two additional areas of potential attack are illustratively depicted by shaded lightning bolts at the network controller 201 and one of the applications 203. Here again, network behavior is learned and network constraints are automatically generated, and administrative policies and invariants are implemented over network characteristics to guard against undesirable network flows. Also, replicated execution is used to verify untrusted controller actions. Generally, untrusted controller communication is mediated here by a shim (embodying the protector 213). An external checker runs out of band and executes a replica of the controller (215) to validate all actions; this involves replication of all relevant controller activity, including packet-ins and packet-out (via a packet replicator 217), while a mismatch in controller and external replica activity raises a flag. "Relevant" network activity, or "relevant" control messages or other network flows, can be understood to refer to any and all activity, messages and/or flows that fulfill essentially any predetermined criteria from the point of view of secure network functioning; e.g., such "relevant" activity, messages and flows can be considered those sufficiently relevant or important as to be monitored to assist in detecting possible security attacks on the network.

Generally, it can be appreciated that, in accordance with at least one embodiment of the invention, comprehensive coverage is provided against broad classes of existing and novel (active, passive and side-channel) attacks on all network entities. A minimal trusted computing base is leveraged, and replicated execution is used to attest network activity in real time, where verification is triggered only upon selected network events. Invariants are automatically generated by observing network activity, and mechanisms are provided for guided invariant learning to achieve high precision. A declarative policy language is provided to specify constraints, while low deployment overhead is involved; no significant modification is required for the controller, switches or end-hosts.

Figure 3:
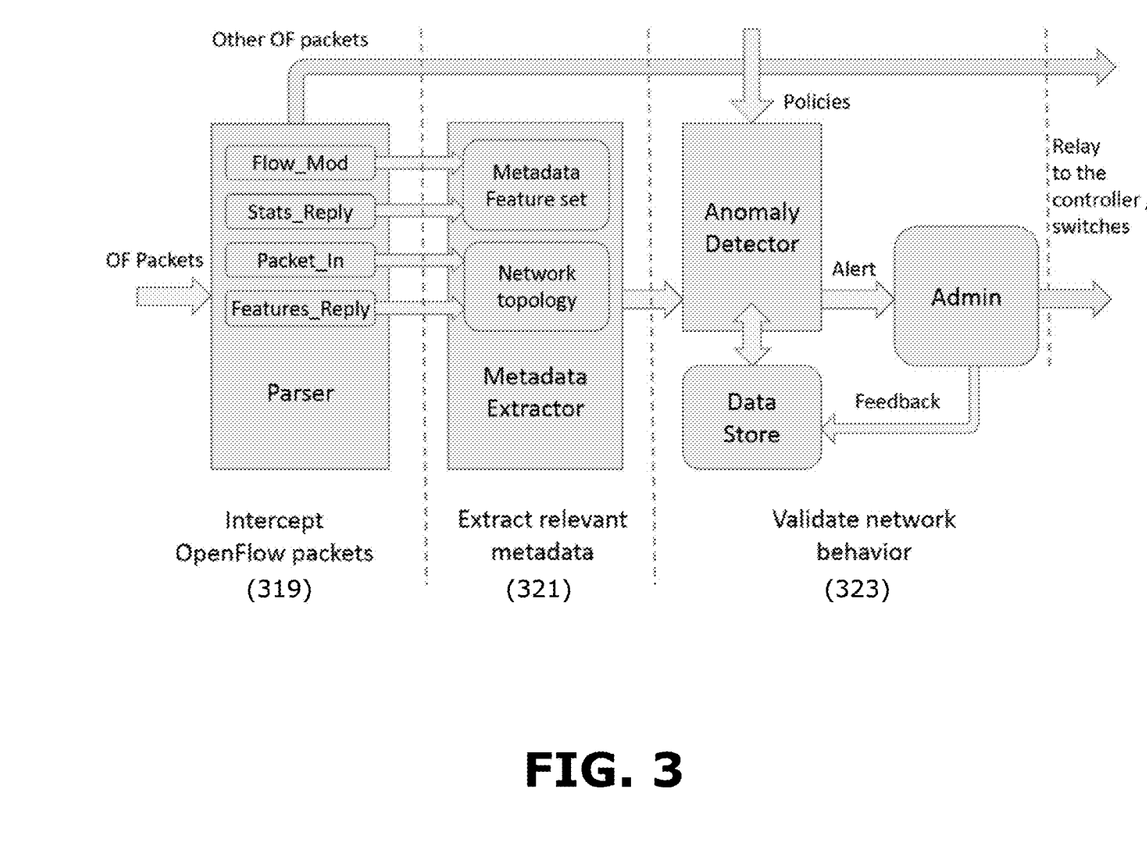
FIG. 3 schematically illustrates a workflow for securing SDNs with a trusted controller, in accordance with at least one embodiment of the invention.

By way of an illustrative working example, FIG. 3 schematically illustrates a workflow for securing SDNs with a trusted controller, in accordance with at least one embodiment of the invention; such a workflow can be executed, e.g., by a protector such as that indicated at 113 in FIG. 1. In first step (319), relevant message packets (e.g., from an initial stream of OpenFlow message packets) are intercepted by a parser. Such packets may include (as shown): PACKET_IN, FLOW_MOD, STATS_REPLY and FEATURES_REPLY. Packets not intercepted ("other OpenFlow packets") are permitted to continue directly to the controller and/or switches.

In a subsequent step, in accordance with at least one embodiment of the invention, relevant metadata are extracted from the intercepted packets (321). Such extraction may be based on a standing metadata feature set and on the network topology, to yield metadata such as source/destination IP and MAC, switch and out-port information, and flow-level statistics. Based on the extracted metadata, network behavior can then be validated (323) against an input set of policies. As such, an anomaly detector can use incremental flow graphs and custom algorithms to build a working model of the network. An alert can then be sent to an administrator (or administration program) if it is determined that metadata have been modified because of changes in traffic flows. As needed, the administrator can send feedback to a data store that also is used by the anomaly detector, and otherwise act as "gatekeeper" to permit an onward relay of any and all intercepted data packets to a controller and/or switches.

Figure 4:
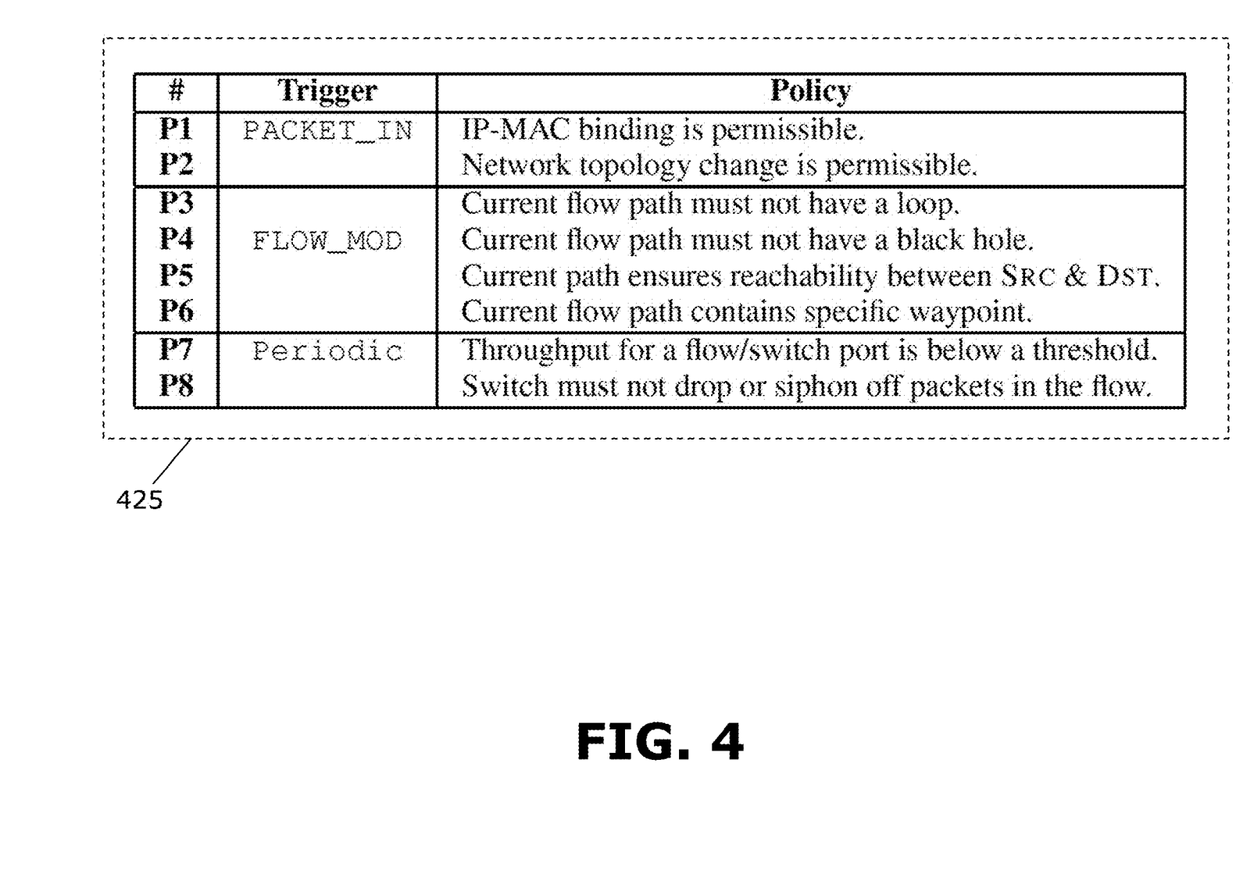
FIG. 4 sets forth a set of policies for constraint verification.

In accordance with at least one embodiment of the invention, FIG. 4 sets forth a set of policies 425 for constraint verification. In the validating step (323 in FIG. 3), a set of incremental flow graphs are built to model the state of the network. For each flow, a verification is made as to whether constraints are satisfied on every network update. Since traversal of flow graphs can be excessively time-consuming, waypoints for the flow are cached. Verification is then performed with respect to specific triggers as shown in FIG. 4. Thus, by way of an illustrative example, with PACKET_IN as a trigger, two policies are confirmed (IP-MAC binding is permissible, network topology change is permissible).

In accordance with at least one embodiment of the invention, it should be appreciated that not all constraints can be checked using path consistency, thus flow consistency checks can be leveraged via a custom algorithm. For example, a metric (e.g., similarity index) can be used to represent the nature of traffic flows and to identify any and all malicious switches in a flow path.

Figure 5:
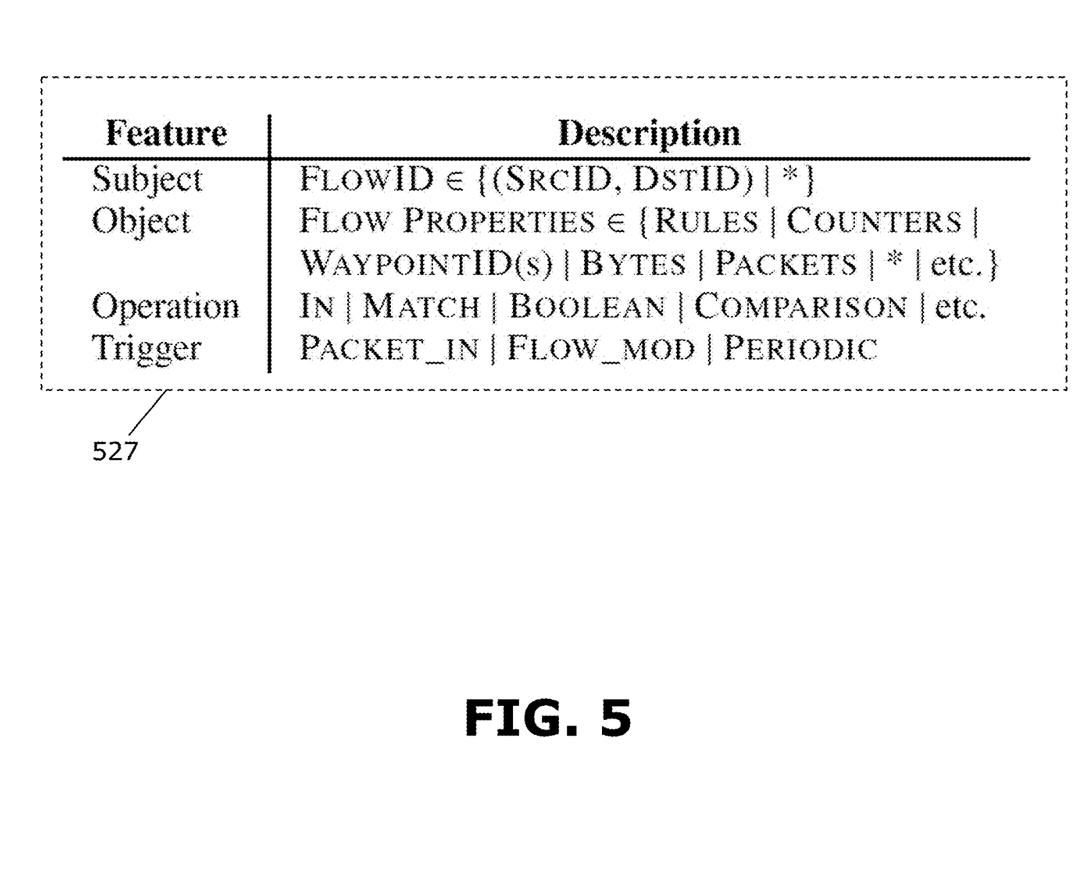
FIG. 5 sets forth an example of a policy language implemented by a policy engine.
Figure 6:
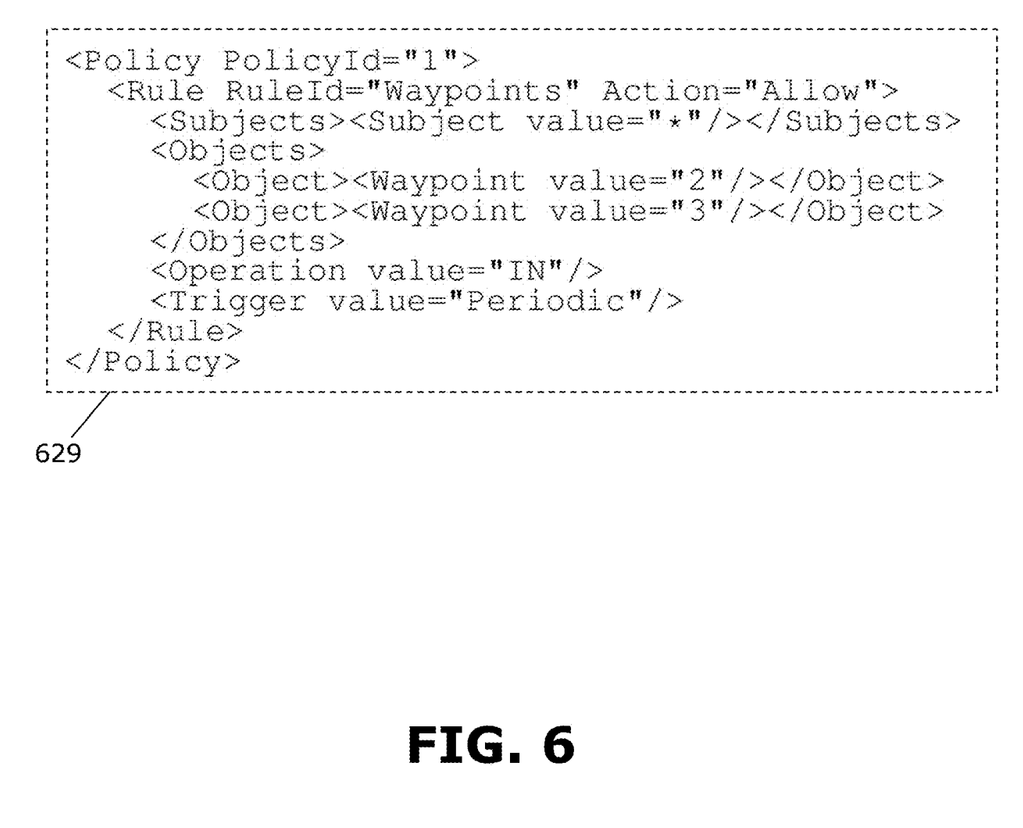
FIG. 6 provides an example of a policy.

In accordance with at least one embodiment of the invention, FIG. 5 sets forth an example of a policy language implemented by a policy engine. While provided here only for illustrative purposes, the policy language of FIG. 5 encompasses a lightweight policy framework centered on traffic flows. It only checks policies and does not enforce the same, while specifying subjects, objects, operations and triggers. Merely by way of illustrative example, FIG. 6 sets forth a policy which checks if all flows pass through specific waypoints.

In brief recapitulation, it can be appreciated from the foregoing that systems and methods, as broadly contemplated herein, provide coverage (or protection) against a class of existing and unknown security attacks. Such coverage and protection involves observable changes to network properties such that these changes can be directly inferred from the intercepted control messages.

In accordance with at least one embodiment of the invention, quantitative scores and values as determined herein can be stored in memory or displayed to a user on a screen, as might fit the needs of one or more users.

Figure 7:
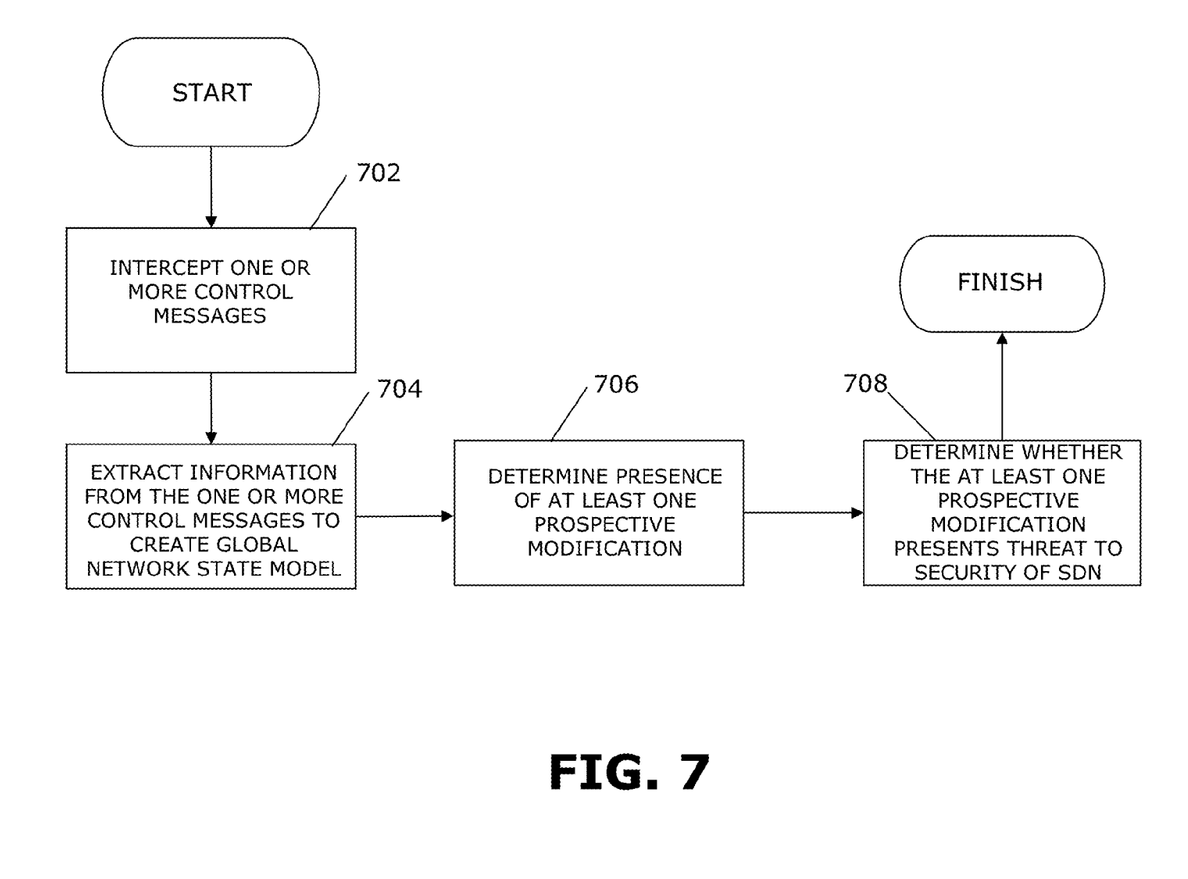
FIG. 7 sets forth a process more generally for detecting security attacks and securing a software defined network.

FIG. 7 sets forth a process more generally for detecting security attacks and securing a software defined network, in accordance with at least one embodiment of the invention. It should be appreciated that a process such that broadly illustrated in FIG. 7 can be carried out on essentially any suitable computer system or set of computer systems, which may, by way of an illustrative and non-restrictive example, include a system such as that indicated at 12' in FIG. 8. In accordance with an example embodiment, most if not all of the process steps discussed with respect to FIG. 7 can be performed by way of a processing unit or units and system memory such as those indicated, respectively, at 16' and 28' in FIG. 8.

As shown in FIG. 7, in accordance with at least one embodiment of the invention, one or more control messages are intercepted (702). Information is extracted from the one or more control messages to create a global network state model (704), and there is determined, from the extracted information, presence of at least one prospective modification to the global network state model (706). Thereupon, a determination is made as to whether the at least one prospective modification presents a threat to security of the software defined network (708).

Figure 8:
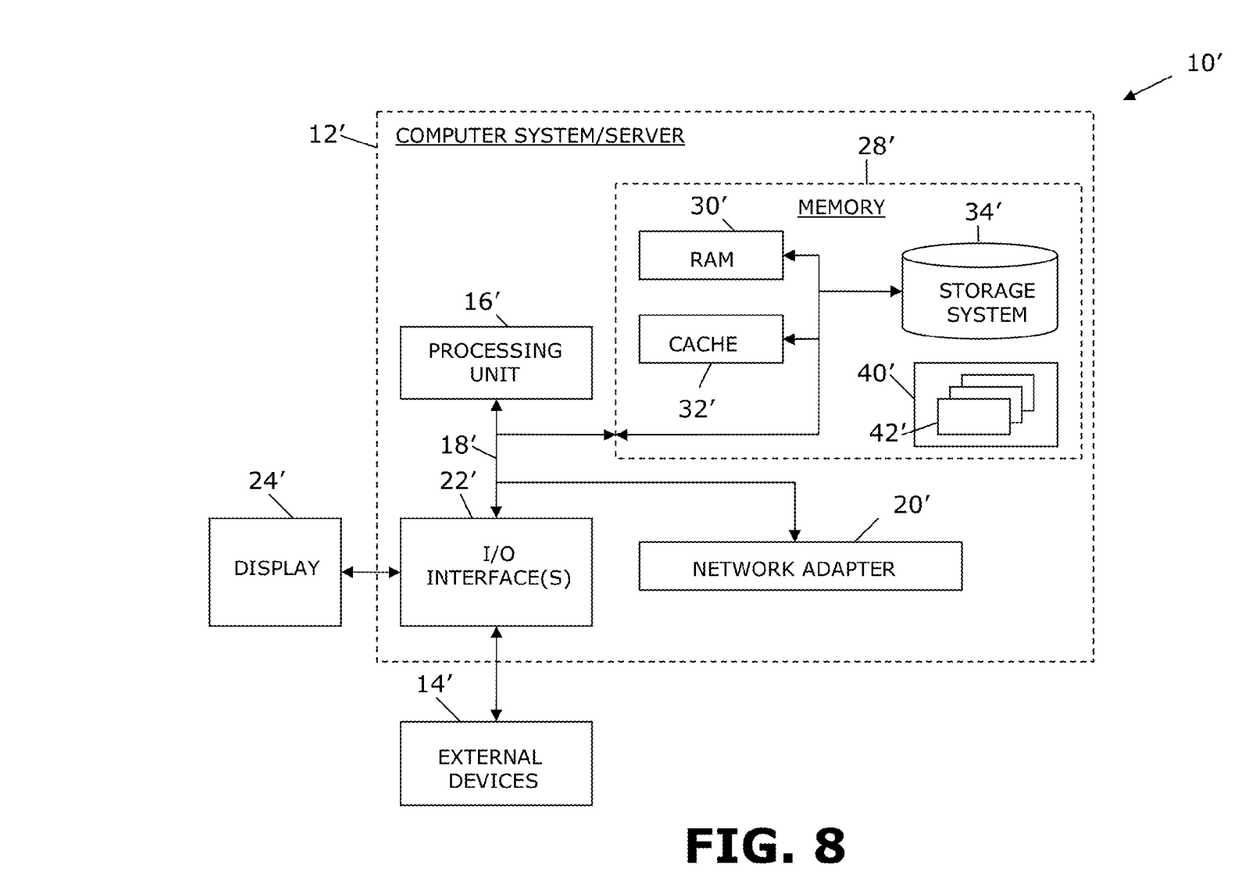
FIG. 8 illustrates a computer system.

Referring now to FIG. 8, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of detecting security attacks and securing a software defined network, said method comprising:
   utilizing at least one processor to execute computer code configured to perform the steps of:
   generating a representative global network state and a plurality of network constraints, wherein the representative global network state identifies representative traffic flow paths and traffic volume of the software defined network;
   intercepting one or more control messages;
   extracting information from the one or more control messages to create a current global network state, wherein the current global network state identifies current traffic flow paths and traffic volume of the software defined network;
   determining, from the extracted information, presence of at least one modification to the software defined network, wherein the determining comprises validating the current global network state against the representative global network state and plurality of network constraints and identifying at least one change between the representative traffic flow paths and traffic volume of the software defined network and current traffic flow paths and traffic volume of the software defined network; and
   thereupon determining whether the at least one modification presents a threat to security of the software defined network.

2. The method according to claim 1, comprising:
   said determining whether the at least one modification presents a threat to security comprising recording a deviation from the representative global network state, and thereupon generating an alert.

3. The method according to claim 2, comprising:
   obtaining administrator feedback with respect to the alert; and
   augmenting the representative global network state based upon the administrator feedback.

4. The method according to claim 1, wherein said determining whether the at least one modification presents a threat to security comprises:
   validating the at least one modification as being secure; and thereupon permitting passage of the intercepted one or more control messages.

5. The method according to claim 4, wherein said validating comprises validating relative to a previously known representative global network state.

6. The method according to claim 1, wherein the one or more control messages comprise control messages flowing to one or more network controllers.

7. The method according to claim 6, wherein the one or more network controllers comprises a trusted network controller.

8. The method according to claim 6, wherein the one or more network controllers comprises an untrusted network controller.

9. The method according to claim 6, wherein the one or more control messages flow between at least one network element and the one or more network controllers.

10. The method according to claim 6, wherein the one or more control messages flow between at least one system administrator and the one or more network controllers.

11. The method according to claim 1, wherein said extracting comprises extracting header information.

12. The method according to claim 1, wherein the current global network state is created incrementally.

13. The method according to claim 1, wherein said intercepting comprises intercepting control message packets.

14. The method according to claim 1, wherein said intercepting comprises intercepting and replicating one or more control messages.

15. The method according to claim 1, wherein the one or more control messages comprise one or more control messages determined to be relevant to security of the software defined network.

16. An apparatus for detecting security attacks and securing a software defined network, said apparatus comprising:
at least one processor; and
a computer readable storage medium having computer readable program code embodied therewith and executable by the at least one processor, the computer readable program code comprising:
computer readable program code configured to generate a representative global network state and a plurality of network constraints, wherein the representative global network state identifies representative traffic flow paths and traffic volume of the software defined network;
computer readable program code configured to intercept one or more control messages;
computer readable program code configured to extract information from the one or more control messages to create a current global network state, wherein the current global network state identifies current traffic flow paths and traffic volume of the software defined network;
computer readable program code configured to determine, from the extracted information, presence of at least one modification to the software defined network, wherein the code configured to determine comprises code that validates the current global network state against the representative global network state and plurality of network constraints and code that identifies at least one change between the representative traffic flow paths and traffic volume of the software defined network and current traffic flow paths and traffic volume of the software defined network; and
computer readable program code configured to thereupon determine whether the at least one modification presents a threat to security of the software defined network.

17. A computer program product for detecting security attacks and securing a software defined network, said computer program product comprising:
a non-transitory computer readable storage medium having computer readable program code embodied therewith, the computer readable program code comprising:
computer readable program code configured to generate a representative global network state and a plurality of network constraints, wherein the representative global network state identifies representative traffic flow paths and traffic volume of the software defined network;
computer readable program code configured to intercept one or more control messages;
computer readable program code configured to extract information from the one or more control messages to create a current global network state, wherein the current global network state identifies current traffic flow paths and traffic volume of the software defined network;
computer readable program code configured to determine, from the extracted information, presence of at least one modification to the software defined network, wherein the code configured to determine comprises code that validates the current global network state against the representative global network state and plurality of network constraints and code that identifies at least one change between the representative traffic flow paths and traffic volume of the software defined network and current traffic flow paths and traffic volume of the software defined network; and
computer readable program code configured to thereupon determine whether the at least one modification presents a threat to security of the software defined network.

18. The computer program product according to claim 17, wherein:
determining whether the at least one modification presents a threat to security comprises recording a deviation from the representative global network state, and thereupon generating an alert.

19. The computer program product according to claim 17, wherein determining whether the at least one modification presents a threat to security comprises:
validating the at least one modification as being secure; and
thereupon permitting passage of the intercepted one or more control messages.

20. A method comprising:
defining a representative global network state and a plurality of network constraints, wherein the representative global network state identifies representative traffic flow paths and traffic volume of a software defined network;
intercepting one or more control messages flowing to one or more network controllers, the one or more control messages comprising one or more control messages determined to be relevant to security of the software defined network;
extracting information from the one or more control messages to create a current global network state, wherein the current global network state identifies current traffic flow paths and traffic volume of the software defined network; and determining whether at least one modification to the global network state model presents a threat to security of the software defined network, via:

recording a deviation from the representative global network state, wherein the recording comprises validating the current global network state against the representative global network state and plurality of network constraints and identifying at least one change between the representative traffic flow paths and traffic volume of the software defined network and current traffic flow paths and traffic volume of the software defined network; and thereupon generating an alert.

* * * * *